3,002,919
HYDROFORMING CATALYST AND PROCESS
Elroy Merle Gladrow and Charles Newton Kimberlin, Jr., Baton Rouge, La., assignors to Esso Research and Engineering Company, a corporation of Delaware
No Drawing. Filed Dec. 10, 1958, Ser. No. 779,295
5 Claims. (Cl. 208—136)

The present invention relates to new and improved catalysts and particularly to the preparation of catalysts that are particularly suited for use in continuous or fluid hydroforming systems.

Hydroforming is a well known and widely used process for upgrading hydrocarbon fractions boiling in the motor gasoline or naphtha boiling range to increase their octane number and to improve their burning or engine cleanliness characteristics. In hydroforming the hydrocarbon fraction or naphtha in vapor form is contacted at elevated temperatures and pressures in admixture with hydrogen or hydrogen-rich process or recycle gas with solid catalytic material for periods sufficient to effect the desired improvement in the naphtha. Under the conditions applied there is no net consumption of hydrogen and ordinarily, in fact, there is a net production of hydrogen.

Hydroforming operations are ordinarily carried out at temperatures of 750–1050° F. in the pressure range of about 50 to 1000 p.s.i.g. and in contact with such catalysts as platinum, molybdenum oxide, chromium oxide or generally oxides and sulfides of group VI metals and certain metals of group VIII of the periodic system of elements preferably dispsersed or supported on a base or spacing agent such as alumina gel, activated alumina, zinc aluminate spinel and the like.

Hydroforming may be carried out in fixed bed, moving bed and fluidized solids systems. In the latter, naphtha vapors and hydrogen are passed continuously through a dense fluidized bed of finely divided hydroforming catalyst on a reaction zone. Partially spent (equilibrium) catalyst particles are withdrawn continuously from the dense bed in the reactor vessel, stripped of vaporizable combustible materials and passed to a separate regeneration zone where carbonaceous deposits are removed by burning with air or a mixture of air and recycle flue gas ordinarily in a dense, fluidized bed similar to that maintained in the reaction zone. Regenerated catalyst is continuously withdrawn from the regeneration zone, stripped of oxygen and carbon oxides and then returned to the dense bed in the reactor with or without prior contact with hydrogen or other reducing gas which effects a partial reduction of the oxidized, regenerated catalyst.

Fluid hydroforming, using molybdenum oxide on alumina catalysts, is a highly effective process since it is continuous in nature and reaction and regeneration conditions are capable of close control. This process is capable of running feed stocks containing substantial amounts of sulfur as well as higher boiling naphthas much more effectively than processes using platinum on alumina catalysts.

Hydroforming processes are conducted, as indicated above, at elevated pressures. Accordingly equipment built to withstand these pressures is costly to construct and maintain. Moreover, compressors necessary for the circulation of recycle gas and regeneration gas are high in initial cost and in view of the high power requirements they are costly to operate. Accordingly, much effort and money has been and is being expended in order to develop improved catalysts, i.e., catalysts of higher activity which will permit the charging of larger amounts of feed stock per day to a reforming reactor of a given size or catalysts of improved selectivity giving higher yields or higher octane number motor gasolines.

It has now been found that the activity as well as the selectivity of molybdenum oxide-alumina hydroforming catalysts can be substantially improved by adding minor amounts of oxides of certain metals of group III of the periodic system. Specifically, it has been found that minor amounts of indium oxide and/or gallium oxide added to a molybdenum oxide on alumina catalyst improves the activity and the selectivity of these catalysts in the hydroforming of naphthas. Higher activity, increased yield of liquid product and lower coke makes are a result.

The catalysts that may be improved in accordance with the present invention are those containing molybdenum oxide dispersed upon an alumina support. These catalysts ordinarily contain from about 5 to about 15, preferably about 10 wt. percent of molybdenum oxide upon the alumina support. The support consists essentially of alumina in an active or adsorptive form which may be prepared in any manner known to the art. A particularly advantageous form is that obtained by reacting sodium aluminate, sodium silicate and aluminum sulfate at a pH of about 9.5, filtering, washing, and drying. The alumina support advantageously contains small amounts, i.e., about 2 to 10 wt. percent, preferably 4 to 5 wt. percent of silica as a stabilizer.

The molybdenum oxide-alumina catalyst compositions can be improved in accordance with the present invention by the incorporation of minor amounts of indium oxide and/or gallium oxide therein. These group III metal oxides can be incorporated simultaneously with or subsequent to the incorporation of the molybdenum oxide. The indium and/or gallium oxide can be applied as a variety of salts, preferably as the chloride or nitrate since these are easily converted to the oxide on calcination. The amount of indium or gallium compound applied should be sufficient to incorporate at most 2.5 wt. preferably 0.1 to 1.0 wt. percent of indium and/or gallium oxide in the final catalyst composition.

The catalysts prepared in accordance with the present invention are particularly adapted for reforming or hydroforming hydrocarbon fractions boiling in the naphtha boiling range or from about 150–200 to about 400° F. The reforming can be effected in fixed, moving or fluidized beds. Hydroforming of naphtha feeds is effected by contacting feed naphtha in vapor phase with the catalysts of this invention at temperatures between about 800 and 1000° F., pressures of from about 100 to 1000 p.s.i.g. at hourly weight space velocities of about 0.5 to 10 parts by weight of naphtha feed per hour per part by weight of catalyst in the reactor and in the presence of about 2000 to 10,000 c.f. of hydrogen or hydrogen-rich recycle gas per barrel of liquid feed.

The following examples are illustrative of the present invention.

Example 1

A sample of alumina wet filter cake prepared by reacting sodium aluminate, sodium silicate and aluminum sulfate is oven dried and calcined 16 hours at 850° F. A 900 gram portion of the calcined alumina was impregnated with 870 cc. of a solution comprising 122 grams ammonium molybdate. Oven dried. The dried material was shaped into 3/16" x 3/16" cylindrical pellets and then activated by heating 4 hours at 1400° F. This catalyst comprises 10% $MoO_3$—90% alumina base and is designated catalyst "A."

Example 2

An 890 gram portion of the calcined alumina base described in Example 1 was impregnated with 870 cc. of a solution comprising 122 grams ammonium molybdate. Oven dried.

Ten grams indium oxide are dissolved in 100 cc. of a 2.4 normal HCl solution and diluted to 700 cc. total volume. This solution was then used to impregnate the oven dried catalyst material. Oven dried again. This material was made into 3/16" x 3/16" cylindrical pellets and activated by heating 4 hours at 1400° F. This catalyst comprises 10% $MoO_3$—1% $In_2O_3$—89% alumina base and is designated catalyst "B."

Example 3

Catalysts "A" and "B" were tested in a fixed catalyst bed reactor for the hydroforming of a light virgin naphtha. Conditions were: 200 p.s.i.g. pressure; 910° F.; 0.7 w./hr./w. feed rate; 2000 c.f. $H_2$/b. added.

| Catalyst | "A" | "B" |
|---|---|---|
| Yields, Vol. Percent: | | |
| $C_5+$ | 75.6 | 77.1 |
| $C_6+$ | 68.3 | 68.7 |
| $C_6+$ Product: | | |
| An. Point, ° F | −9 | −31 |
| API Grav | 40.7 | 40.1 |
| Rel. Activity [1] | 1.3 | 1.5 |
| Rel. Carbon [1] | 0.7 | 0.7 |

[1] Relative to Standard commercial catalyst containing 10 wt. percent $MoO_3$ on a silica stabilized alumina at same test conditions.

Example 4

Several additional samples of catalyst were prepared by incorporating 0.5, 1.0, and 2.5% $In_2O_3$ into the 10% $MoO_3$-alumina catalyst of Example 1. The indium oxide was added by wet impregnation with an $InCl_3$ solution followed by oven drying and activation by heating 6 hours at 1400° F. The catalysts were tested for hydroforming activity under the following conditions:

[Light virgin naphtha feed; 910° F.; 200 p.s.i.g. pressure; 2200 c.f. $H_2$/b.]

| Percent $In_2O_3$ Added | 0 | 0.5 | | 1.0 | | 2.5 | |
|---|---|---|---|---|---|---|---|
| O. N., Res. Clear | 95.0 | 95.0 | 95.0 | 95.0 | 95.0 | 95.0 | 95.0 |
| W./Hr./W | 0.56 | 0.74 | 0.69 | 0.56 | 0.65 | 0.42 | 0.48 |
| $C_5+$ Yield, Vol. percent | 77.0 | 77.6 | 76.4 | 77.6 | 77.0 | 75.2 | 78.5 |
| Carbon, percent | 0.62 | 0.49 | 0.54 | 0.56 | 0.49 | 0.41 | 0.39 |

The following conclusions can be made from the foregoing data.

(1) *Activity.*—Addition of 0.5% $In_2O_3$ definitely increased the activity by a factor of from 23–32%, while 1% $In_2O_3$ showed little effect, and 2.5% $In_2O_3$ definitely depressed the activity by from 14–25%.

(2) *Liquid product yield.*—No change in yield was effected.

(3) *Carbon production.*—Addition of 0.5–1.0% $In_2O_3$ definitely depresses the carbon yields by about 10–20%. At the 2.5% $In_2O_3$ level the carbon is reduced by 34–37%.

In summary, addition of 0.5–1.0% $In_2O_3$ definitely improves activity, reduces coke make, and with no loss in liquid yield. At higher $In_2O_3$ contents, there is a loss in activity which is compensated for by a more substantial reduction in coke make. Once again there is no change in liquid yield.

Example 5

435 grams of the catalyst of Example 1 comprising 10% $MoO_3$ on silica stabilized alumina was impregnated with gallium chloride solution (equivalent to 8.7 g. $Ga_2O_3$). The moist paste was left standing at room temperature for three hours and oven dried. This catalyst comprising 2% $Ga_2O_3$, 9.8% $MoO_3$ and 88.2% base alumina was activated for 16 hours at 1400° F. This catalyst was tested in a fixed bed reactor for the hydroforming of a light virgin naphtha. Test conditions were: 200 p.s.i.g. pressure; 910° F.; 2200 c.f. of hydrogen per barrel of naphtha. At a Research clear O.N. of 95, the feed rate was 0.86 as against 0.56 w./hr./w. for the catalyst of Example 1; the $C_5+$ liquid yield was 78% versus 77% and the carbon make was 0.49 versus 0.62% for the catalyst of Example 1.

These data show that the catalyst containing gallium oxide has greatly improved activity, improved liquid product yield and lower carbon production than the unpromoted molybdenum oxide-alumina catalyst.

The foregoing specification discloses a limited number of embodiments of the present invention. It will be understood that this invention is not limited thereto since numerous variations are possible without departing from the scope of this invention as defined in the following claims.

What is claimed is:

1. A reforming catalyst consisting essentially of from about 5 to 15 wt. percent of molybdenum oxide, a minor amount of a group III metal oxide selected from the group consisting of indium oxide and gallium oxide the remainder being adsorptive alumina.

2. A reforming catalyst consisting of 5 to 15 wt. percent molybdenum oxide, 0 to 10 wt. percent silica, up to 2.5 wt. percent of a group III metal oxide selected from the class consisting of indium oxide and gallium oxide the remainder being adsorptive alumina.

3. A reforming catalyst consisting of about 10 wt. percent of molybdenum oxide, and 0.1 to 1.0 wt. percent indium oxide dispersed upon an adsorptive alumina support.

4. A reforming catalyst consisting of about 10 wt. percent of molybdenum oxide, and 0.1 to 1.0 wt. percent gallium oxide dispersed upon an adsorptive alumina support.

5. The process of reforming hydrocarbons boiling in the naphtha boiling range which comprises contacting the naphtha vapors with a catalyst consisting essentially of from about 5 to 15 wt. percent of molybdenum oxide, up to 2.5 wt. percent of a group III metal oxide selected from the class consisting of indium oxide and gallium oxide the remainder being adsorptive alumina at temperatures of 800 to 1000° F., pressures of from 100 to 1000 p.s.i.g. in the presence of from 2000 to 10,000 c.f./b. of hydrogen for a period sufficient to substantially improve the octane number of the naphtha.

References Cited in the file of this patent

UNITED STATES PATENTS

| | | |
|---|---|---|
| 2,337,190 | Greensfelder et al. | Dec. 21, 1943 |
| 2,749,287 | Kirschenbaum | June 5, 1956 |
| 2,765,260 | Yoder | Oct. 2, 1956 |
| 2,784,147 | Strecker et al. | Mar. 5, 1957 |
| 2,824,089 | Peters | Feb. 18, 1958 |